United States Patent
Won et al.

(10) Patent No.: US 7,327,414 B2
(45) Date of Patent: Feb. 5, 2008

(54) LIQUID CRYSTAL DISPLAY DEVICE HAVING PARTICULAR FIXING DEVICE FOR LIGHT-GUIDING PLATE

(75) Inventors: Se Chang Won, Pyeongtaek-shi (KR); In Yong Yoo, Daegu-kwangyokshi (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 386 days.

(21) Appl. No.: 11/017,319

(22) Filed: Dec. 20, 2004

(65) Prior Publication Data
US 2005/0134761 A1  Jun. 23, 2005

(30) Foreign Application Priority Data
Dec. 23, 2003  (KR)  .................. 10-2003-0095421

(51) Int. Cl.
*G02F 1/1333* (2006.01)
*G02F 1/1335* (2006.01)
(52) U.S. Cl. ................. 349/58; 349/60; 349/62
(58) Field of Classification Search .............. 349/58, 349/60, 62
See application file for complete search history.

(56) References Cited

U.S. PATENT DOCUMENTS 6,388,722 B1 *  5/2002  Yoshii et al. .................. 349/62
6,992,736 B2 *  1/2006  Saito et al. .................... 349/58
2001/0002145 A1 *  5/2001  Lee et al. ...................... 349/58

FOREIGN PATENT DOCUMENTS

KR  2001-0048850  6/2001

OTHER PUBLICATIONS

Office action dated Aug. 31, 2006 for corresponding Korean Patent Application 10-2003-0095421.

* cited by examiner

*Primary Examiner*—Mike Qi
(74) *Attorney, Agent, or Firm*—Brinks Hofer Gilson & Lione (57) ABSTRACT

An LCD device for stably fixing a light-guiding plate is disclosed. The LCD includes a support main; a lamp provided along one side of the support main; a light-guiding plate provided in the support main opposite to the lamp; and at least one fixing device provided on an inner surface of the support main, to prevent the light-guiding plate from being moved. The fixing device contains multiple plates arranged in a C shape. Slits are formed in the center plate. An elastic plate is disposed between the slits and a projection is disposed on the elastic plate. The projection contacts the light-guiding plate. The support main contains a recess into which the projection moves when the light-guiding plate expands and the elastic plate deforms.

40 Claims, 6 Drawing Sheets

LIQUID CRYSTAL DISPLAY DEVICE HAVING PARTICULAR FIXING DEVICE FOR LIGHT-GUIDING PLATE

The present invention claims the benefit of the Korean Application No. P2003-95421 filed on Dec. 23, 2003, which is hereby incorporated by reference.

BACKGROUND

1. Field

The present invention relates to a liquid crystal display (LCD) device, and more particularly, to an LCD device in which the light-guiding plate is prevented from moving to one side.

2. Discussion of the Related Art

In general, an LCD device includes an LCD panel having lower and upper glass substrates, and liquid crystal injected between the upper and lower substrates; a polarizing plate for polarizing light to lower and upper surfaces of the LCD panel; and a light source and a light-guiding plate for uniformly providing light to the LCD panel. At this time, the LCD panel displays a desired image by switching liquid crystal cells according to a video signal inputted from the external. The LCD device has the advantageous characteristics such as lightness in weight, thin profile, and low power consumption.

Figure 1:
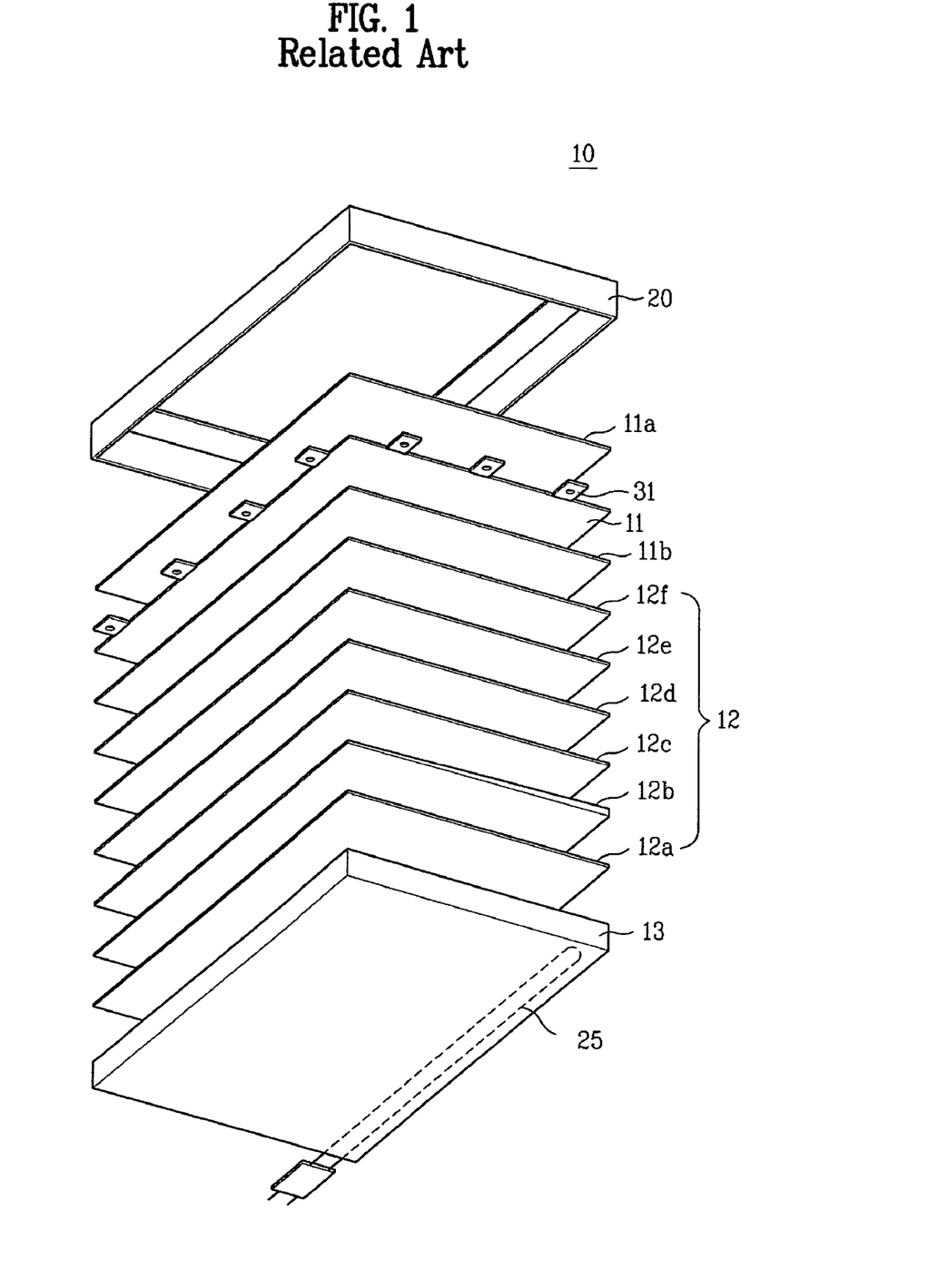
FIG. 1 is an exploded perspective view of a liquid crystal display module (LCM) according to the related art.

FIG. 1 is an exploded perspective view of an LCD device 10.

As shown in FIG. 1, unlike a CRT (Cathode Ray Tube), the LCD device 10 does not emit light in itself. Thus, the LCD device 10 requires an additional light source. The LCD device 10 includes an LCD panel 11 for displaying an image, and a backlight 12 for providing light to the LCD panel 11. Herein, the LCD panel 11 and the backlight 12 are supported with a support frame like a support main 13 and a top case 20. The top case 20 of a metal material is covered along an upper edge of the LCD panel 11, and lower and side parts of the LCD panel 11 are supported by the support main 13. Also, the support main 13 is formed of a plastic material, and the backlight 12 and the LCD panel 11 are received into the inside of the support main 13.

At this time, the backlight 12 is comprised of a reflective plate 12a, a light-guiding plate 12b, a diffusion sheet 12c, a first prism sheet 12d, a second prism sheet 12e, and a protective sheet 12f, to be sequentially received into the inside of the support main 13. Also, a lamp 25 of emitting light is provided in shape of a linear type or "L" along the side of the support main 13.

The lamp 25 is provided along the side of the support main 13 by a lamp housing (not shown), and the side of the light-guiding plate 12b is opposite to the lamp 25. At this time, the lamp housing protects the lamp 25, and concentrates the light emitted from the lamp 25 into the side of the light-guiding plate 12b.

The light emitted from the lamp 25 is incident on the side of the light-guiding plate 12b, and is uniformly emitted to the upper surface of the light-guiding plate 12b toward the LCD panel 11. Accordingly, the LCD panel 11 controls the light being uniformly guided from the light-guiding plate 12b according to unit pixel regions, and displays the desired image.

The LCD panel 11 is comprised of a lower substrate having a thin film transistor array and an upper substrate having a color filter array, the lower and upper substrates being bonded to each other at a predetermined interval therebetween, and a liquid crystal layer formed in a space between the bonded two substrates. Then, lower and upper polarizing plates 11b and 11a are respectively formed on lower and upper surfaces of the LCD panel 11. In addition, TCPs 31 (Tape Carrier Package) are provided on the lower substrate, and are electrically connected with a PCB (Printed Circuit Board, not shown) having a driving circuit for driving the LCD panel 11.

Figure 2:
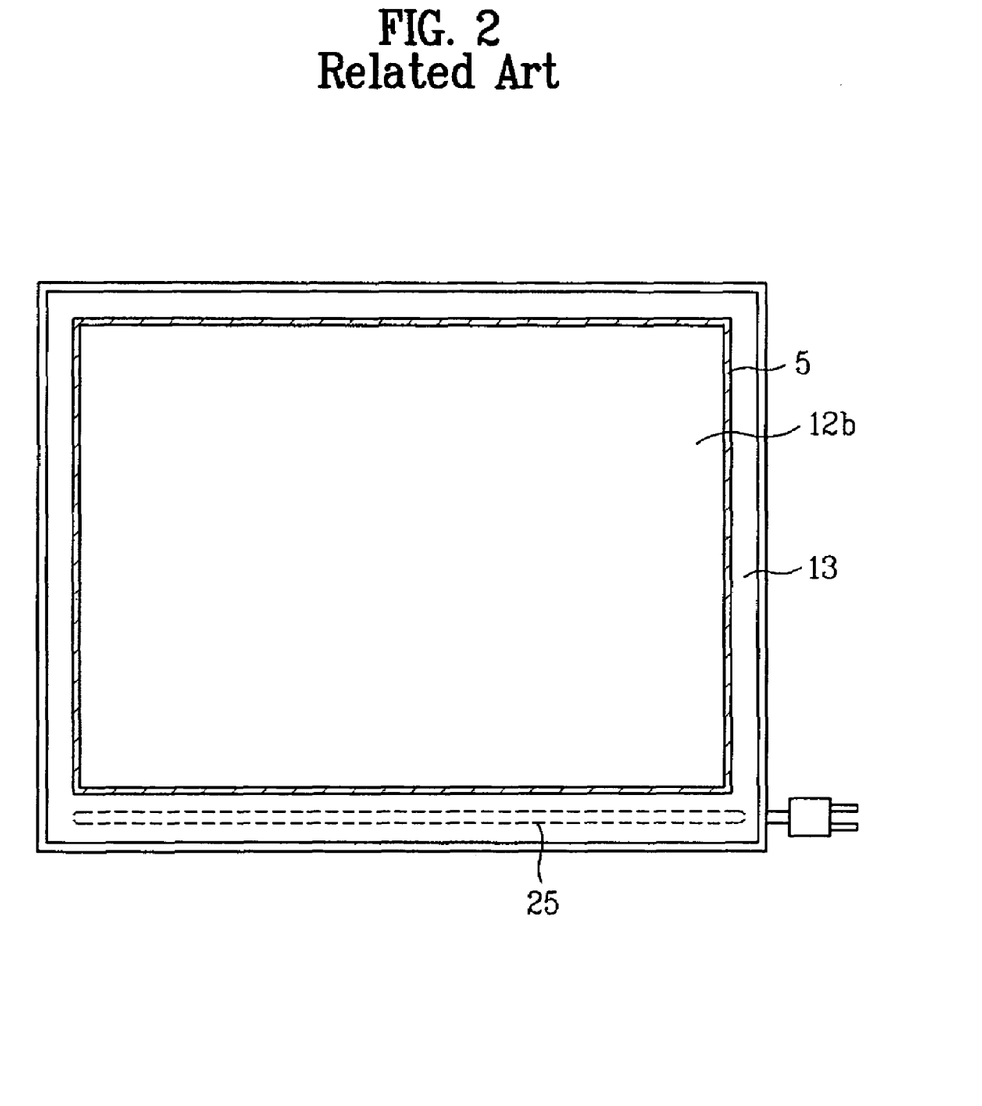
FIG. 2 is a plane view of an LCD device having a light-guiding plate according to the related art.

FIG. 2 is a plane view for explaining the light-guiding plate provided on the support main according to the related art.

Referring to FIG. 2, the light-guiding plate 12b is provided on the support main 13, and the lamp 25 is provided on the support main 13 along one side of the light-guiding plate 12b. As the power is supplied to the lamp 25, the lamp 25 emits light and heat. Also, the heat generated from the lamp 25 effects the light-guiding plate 12b, so that the light-guiding plate 12b may expand due to the heat of the lamp 25.

Accordingly, the light-guiding plate 12b may expand due to the heat generated from the lamp 25, whereby the light-guiding plate 12b of the support main 13 may bend. As a result, it is impossible to provide the uniform light to the LCD panel 11.

To solve this problem, the size of the light-guiding plate 12b is controlled to have a minute space 5 between the light-guiding plate 12b and the support main 13 at all directions. At this time, the minute space 5 has a width of approx. 0.3 mm. Thus, even though the light-guiding plate 12b expands, it is possible to prevent the damage of the light-guiding plate 12b.

However, the related art LCD device has the following disadvantages.

First, since the LCD device is generally used for a monitor and a television, the LCD device displays the image in the standing state. As a result, the light-guiding plate may move to one side. If the light-guiding plate is moved toward the lamp, and then is adjacent to or in contact with the lamp, the light-guiding plate may be overheated and damaged.

Furthermore, in case the light-guiding plate leans to one side due to external force, one side of the light-guiding plate is slantingly received into the support main. In this state, if the light-guiding plate expands due to the heat of the lamp, the light-guiding plate may not be received into the minute space.

SUMMARY

By way of introduction only, in one embodiment, a display device includes a support main, a lamp that supplies light to the display device, a light-guiding plate provided in a space formed by the support main; and a fixing device that contacts a side of the light-guiding plate and inhibits movement of the light-guiding plate toward the support main.

In another embodiment, the display device includes a support main, a lamp that supplies light to the display device, a light-guiding plate provided in a space formed by the support main; and means for inhibiting movement of the light-guiding plate toward the support main.

In another embodiment, a method includes providing a display device with a support main containing a space formed therein and inserting a light-guiding plate into the space formed in the support main such that movement of the light-guiding plate toward an inner wall of the support main defining the space is restrained by a resilient portion containing a projection that contacts a side of the light-guiding plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to one embodiment of the present invention will be described with reference to the accompanying drawings.

Figure 3:
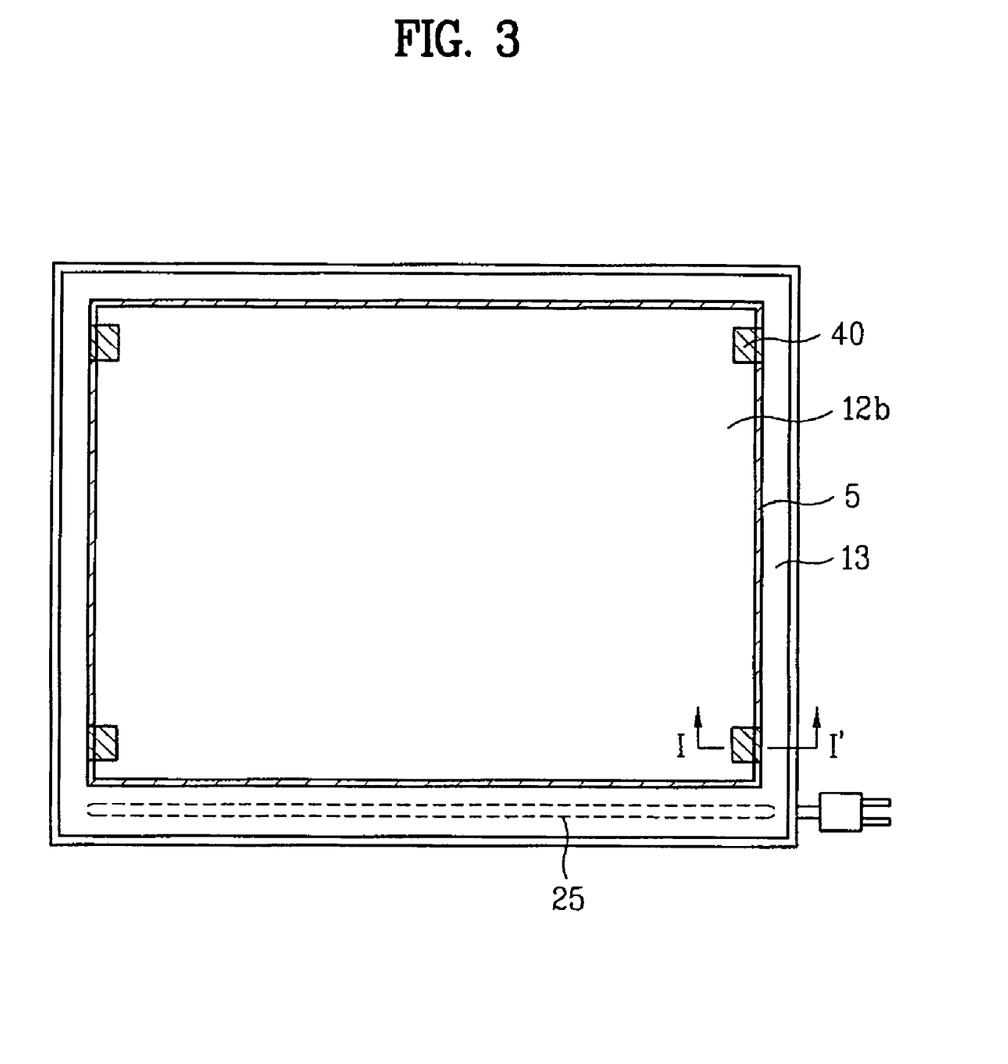
FIG. 3 is a plane view of an LCD device having a light-guiding plate and a fixing device according to one embodiment of the present invention.

FIG. 3 shows a plane view of an LCD device having a light-guiding plate and a fixing device provided in a support main.

As shown in FIG. 3, an LCD device according to the present invention includes a support main 13, a lamp 25, a light-guiding plate 12b, and a fixing device 40 for preventing the light-guiding plate 12b from being moved.

On the support main 13, a reflective plate ('12a' of FIG. 1), the light-guiding plate 12b, a diffusion sheet ('12c' of FIG. 1), a first prism sheet ('12d' of FIG. 1), a second prism sheet ('12e' of FIG. 1), a protective sheet ('12f' of FIG. 1), and an LCD panel ('11' of FIG. 1) are provided in sequence, and a lamp 25 for emitting light is provided along the side of the support main 13 in shape of a linear type or "L"-type. FIG. 3 shows the only light-guiding plate 12b among the aforementioned components for convenience.

The light emitted from the lamp 25 is incident on the side of the light-guiding plate 12b, and the incident light is uniformly emitted to an upper side of the light-guiding plate 12b. The stable fixation of the light-guiding plate 12b permits uniform light to be provided to the LCD panel. The fixing device 40 is provided in a space between the light-guiding plate 12b and the support main 13, thereby preventing the movement of the light-guiding plate 12b.

Figure 4:
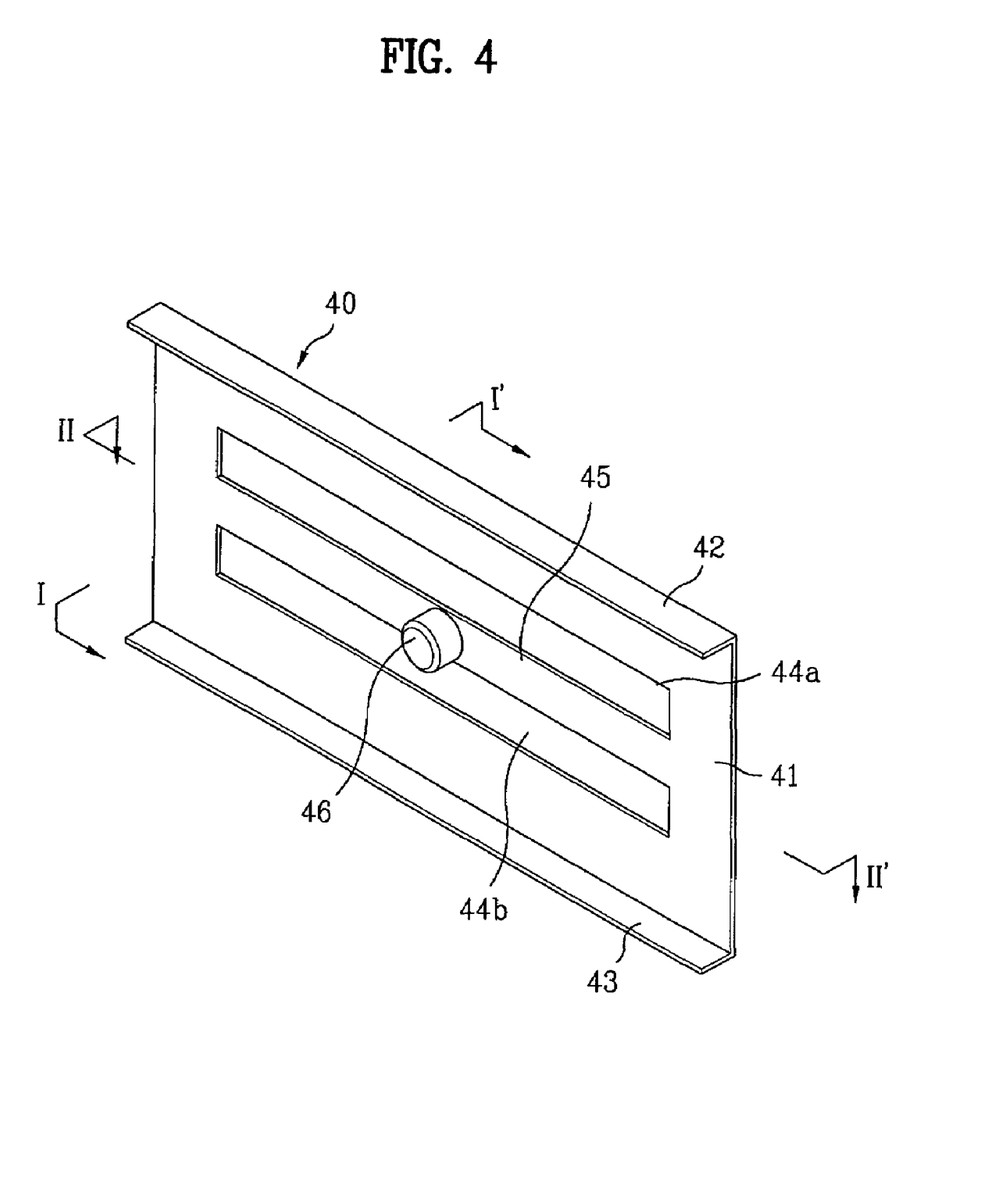
FIG. 4 is a perspective view of a fixing device according to the first embodiment of the present invention.
Figure 5:
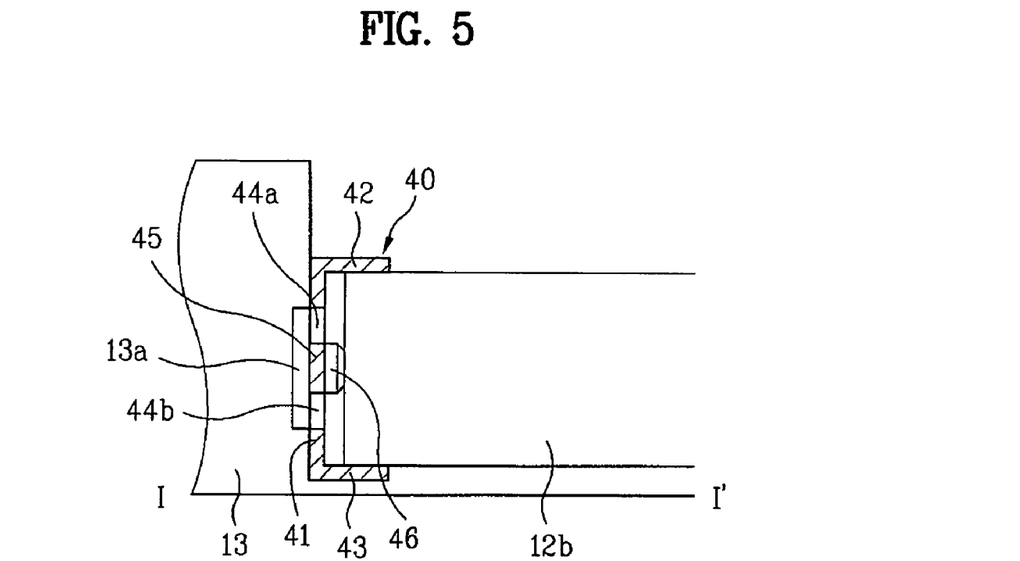
FIG. 5 is a cross sectional view along I-I' of FIG. 3 and FIG. 4.
Figure 6:
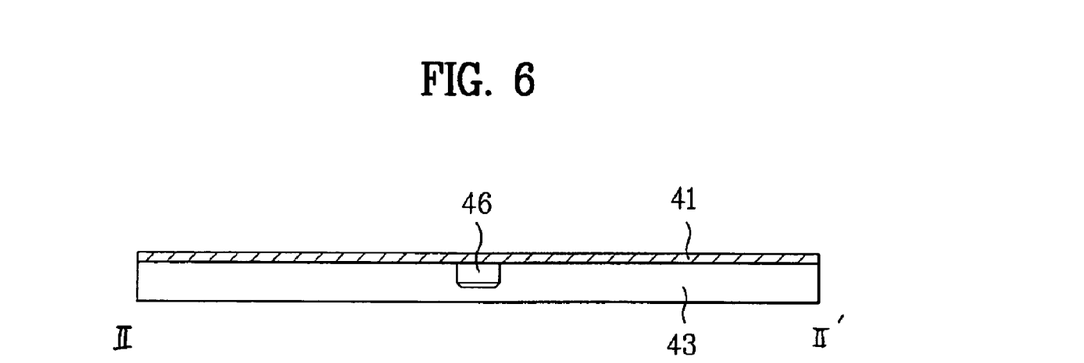
FIG. 6 is a cross sectional view along II-II' of FIG. 4.

FIG. 4 is a perspective view of a fixing device according to the first embodiment of the present invention. FIG. 5 is a cross sectional view along I-I' of FIG. 3 and FIG. 4. FIG. 6 is a cross sectional view along II-II' of FIG. 4.

As shown in FIG. 4 to FIG. 6, a fixing device 40 according to the first embodiment of the present invention includes a first plate 41, second and third plates 42 and 43, first and second slits 44a and 44b, an elastic plate 45, and a projection 46. The second and third plates 42 and 43 are formed at both sides of the first plate 41 perpendicular to the first plate 41. Also, the first and second slits 44a and 44b are formed in parallel along a longitudinal direction of the first plate 41. The elastic plate 45 is formed between the first and second slits 44a and 44b, and the projection 46 is formed in the center of the elastic plate 45.

Herein, the first, second, and third plates 41, 42, 43 are integrally formed. The three plates are formed in a '⊏' shape so that one side of the light-guiding plate 12b is inserted thereto. That is, the second and third plates 42 and 43 are formed in parallel, and the space between the second and third plates 42 and 43 has an interval more than the thickness of the light-guiding plate 12b. Accordingly, the first, second, and third plates 41, 42, 43 are integrally formed and may be referred to as a base.

The projection 46 is projected from the elastic plate 45 such that the projection 46 is in contact with the side of the light-guiding plate 12b when the side of the light-guiding plate 12b is inserted into the fixing device 40. Accordingly, when the side of the light-guiding plate 12b is inserted into the fixing device 40, it is assembled such that the projection 46 is in contact with the side of the light-guiding plate 12b. The end of the projection 46 tapers. As a result, when the side of the light-guiding plate 12b is inserted into the fixing device 40, the contact area between the end of the projection 46 and the side of the light-guiding plate 12b is small.

The elastic plate 45 is formed to have a predetermined interval between the first and second slits 44a, 44b formed in parallel with the first plate 41. That is, the elastic plate 45 is formed as one with the first plate 41. Thus, when the elastic plate 45 is positioned between the first and second slits 44a, 44b, the elastic plate 45 is elastically deformed dependent on the force supplied thereto.

That is, the elastic plate 45, formed between the first and second slits 44a, 44b, is formed in a rectangular shape having a greater length than a width. Thus, when the force is supplied to the elastic plate 45, the elastic plate 45 is deformed. Accordingly, since the elastic plate 45 elastically supports the projection 46, an additional component for supporting the projection 46 is optional.

One elastic plate 45 may be formed in the first plate 41. Alternatively, if three or more slits 44a, 44b are formed, an elastic plate 45 is formed between the adjacent two slits. Also, each elastic plate 45 has the projection, so as to fix the light-guiding plate 12b stably.

As shown in FIG. 3, the plurality of fixing devices 40 are formed in the space 5 at the left and right sides of the light-guiding plate 12b. For stable fixation of the light-guiding plate 12b, it is preferable to form one or more fixing device 40 in lower and upper portions at the left and right sides of the light-guiding plate 12b. Though not shown, the fixing devices 40 may be provided at all sides of the light-guiding plate 12b.

As shown in FIG. 5, the elastic plate 45 for supporting the projection 46 is not in contact with the side of the support main 13. Accordingly, the support main has a groove 13a in correspondence with the elastic plate 45 of the fixing device 40. The groove 13a receives the elastic plate 45 therein when the elastic plate 45 moves backward.

In the LCD device having the fixing device 40, when the light-guiding plate 12b expands due to heat, the function of the fixing device 40 will be described as follows.

In the initial state, the projection 46 fixes the light-guiding plate 12 by clamping the both sides of the light-guiding plate 12b with a restoring force dependent on the elastic deformation of the elastic plate 45. Thus, the fixing device 40 prevents the light-guiding plate 12b from being positioned slantingly on the assembling process. After that, when the light-guiding plate 12b expands due to the heat generated from the lamp 25, the elastic plate 45 is deformed outwardly. At this time, the projection 46 of the fixing device 40 stably fixes both sides of the light-guiding plate 12b.

Referring to FIG. 5, the groove 13a is formed in the side of the support main 13, being in contact with the fixing device 40, wherein the groove 13a receives the elastic plate 45 if the elastic plate 45 deforms. Thus, as the light-guiding plate 12b is heated, the light-guiding plate 12b expands and pushes the projection 46 of the fixing device 40 backward.

As described above, since the. elastic plate 45 is formed of an elastic material, preferably, the first plate 41 of the fixing device 40 is formed of a metal material that is relatively thin. The elastic plate 45 is a divided part by the slits 44a, 44b in one side of the first plate 41. The elastic plate 45 is formed of a metal material and is integrally formed with the first plate 41.

The fixing device may be integrally formed with the support main in another embodiment of the present invention.

Figure 7:
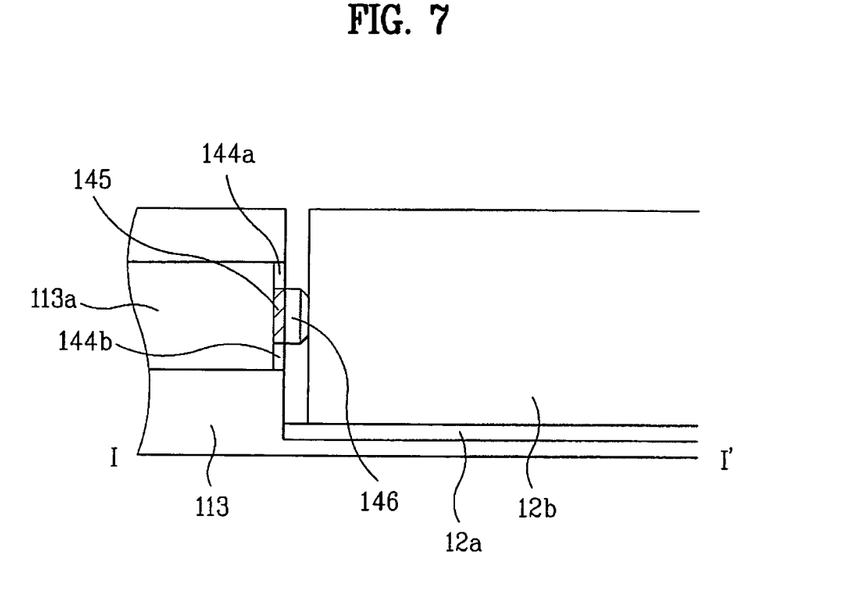
FIG. 7 is a cross sectional view of a fixing device along I-I' of FIG. 4 according to the second embodiment of the present invention.
Figure 8:
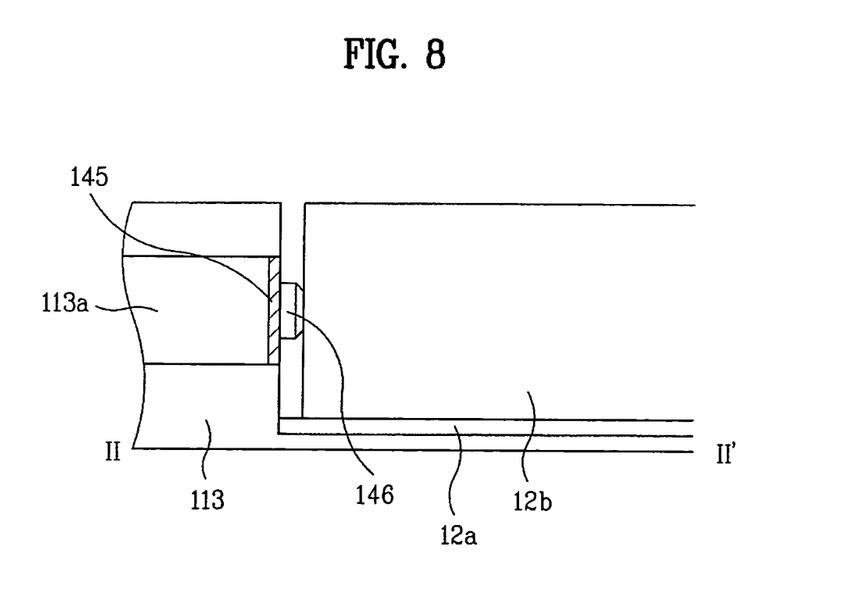
FIG. 8 is a cross sectional view of a fixing device along II-II' of FIG. 4 according to the second embodiment of the present invention.

FIG. 7 is a cross sectional view of a fixing device along I-I' of FIG. 4 according to the second embodiment of the present invention. FIG. 8 is a cross sectional view of a fixing device along II-II' of FIG. 4 according to the second embodiment of the present invention.

That is, a fixing device according to the second embodiment of the present invention is integrally formed with a support main 113. As shown in FIG. 7 and FIG. 8, an elastic plate 145 is formed in a predetermined portion of the support main 113, and a projection 146 is formed in the elastic plate 145. Also, the support main 113 corresponding to the elastic plate 145 has room for the movement of the elastic plate 145, and a hole 113a is formed by a metal mold to smoothly form the support main 113.

At this time, the projection 146 is formed at one side of the support main 113, wherein the projection 146 is projected to be in contact with the side of a light-guiding plate 12b. Also, the elastic plate 145 is formed as one with one side of the support main 113, to support the projection 146.

That is, one side of the support main 113, serving as the fixing device, is formed of a relatively thin material, and the projection 146 is in contact with the light-guiding plate 12b. The projection 146 is formed in the center of one side of the support main 113. The slits 144a, 144b (for reference, '44a', '44b' of FIG. 4) are formed in parallel around the projection 146. The slits 114a, 114b, the elastic plate 145, and the projection 146 have the same front shape as those shown in FIG. 4.

Accordingly, as the light-guiding plate 12b expands due to the heat, the light-guiding plate 12b pushes the projection 146. The hole 113a is formed in the support main 113 in correspondence with the elastic plate 145. Thus, the elastic plate 145 for supporting the projection 45 moves backward, and is received into the hole 113a.

In the LCD device according to the second embodiment of the present invention, a plurality of fixing devices may be provided. These fixing devices are integrally formed with the support main along the both sides of the light-guiding plate. The fixing devices have the same function as that of the first embodiment of the present invention.

As mentioned above, the LCD device according to an embodiment of the present invention has the following advantages. The fixing device stably fixes the light-guiding plate on assembling the LCD device, so that it is possible to prevent the light-guiding plate from being slantingly positioned in the space. Also, it is possible to prevent one side of the light-guiding plate from being adjacent to the electrode of the lamp, thereby preventing the light-guiding plate from being damaged. Furthermore, the fixing device fixes the light-guiding plate with a restoring force by the elastic deformation, whereby it is possible to stably fix the light-guiding plate before and after the light-guiding plate expands due to heat generated by the lamp.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
   a support main;
   a lamp that supplies light to the display device;
   a light-guiding plate provided in a space formed by the support main; and
   a fixing device that contacts a side of the light-guiding plate and inhibits movement of the light-guiding plate toward the support main;
   wherein the fixing device is disposed to any one of the support main, the light-guiding plate, and between the support main and the light-guiding plate.

2. The display device of claim 1, wherein the fixing device comprises:
   a "⊏"-shaped base into which the side of the light-guiding plate is inserted;
   an elastic plate formed in the "⊏"-shaped base; and
   a projection disposed on the elastic plate, the projection in contact with the side of the light-guiding plate.

3. The display device of claim 2, wherein the elastic plate is formed between parallel slits provided on an inner surface of the "⊏"-shaped base.

4. The display device of claim 2, wherein the elastic plate is formed of a thin metal plate.

5. The display device of claim 2, further comprising a groove that is disposed in an inner surface of the support main and receives the elastic plate when the elastic plate deforms.

6. The display device of claim 1, wherein the fixing device comprises:
   a first plate;
   second and third plates formed at opposing sides of the first plate, the second and third plates substantially perpendicular to the first plate;
   an elastic plate formed in the first plate; and
   a projection projecting from the elastic plate, the projection in contact with the side of the light-guiding plate.

7. The display device of claim 6, wherein the first plate has parallel first and second slits provided along a longitudinal direction of the first plate, and the elastic plate is formed between the first and second slits.

8. The display device of claim 6, wherein the first, second, and third plates are integrally formed, the side of the light-guiding plate is inserted between the second and third plates, and a distance between the second and third plates is more than a thickness of the light-guiding plate.

9. The display device of claim 6, wherein an end of the projection is tapered, the tapered end of the projection in contact with the light-guiding plate.

10. The display device of claim 6, wherein the support main has a groove that receives the elastic plate therein when the elastic plate deforms.

11. The display device of claim 10, wherein the elastic plate does not contact the side of the support main.

12. The display device of claim 11, wherein the first plate contacts the side of the support main.

13. The display device of claim 1, further comprising a plurality of fixing devices that contact the light-guiding plate and inhibit movement of the light-guiding plate toward the support main.

14. The display device of claim 13, wherein the fixing devices contact opposing sides of the light-guiding plate.

15. The display device of claim 13, wherein all sides of the light-guiding plate are contacted by the fixing devices.

16. The display device of claim 1, wherein the fixing device is integrally formed with the support main.

17. The display device of claim 16, wherein the fixing device comprises a projection that contacts the side of the light-guiding plate and an elastic plate on which the projection is disposed.

18. The display device of claim 17, wherein the elastic plate is formed between parallel slits provided on an inner surface of the support main.

19. The display device of claim 18, wherein the support main comprises a groove that receives the elastic plate when the elastic plate deforms.

20. The display device of claim 19, wherein the elastic plate is mounted in the groove.

21. The display device of claim 17, wherein an end of the projection is tapered, the tapered end of the projection in contact with the light-guiding plate.

22. The display device of claim 1, wherein the fixing device comprises an elastic plate disposed between the light-guiding plate and the support main.

23. The display device of claim 1, wherein the fixing device is disposed such that the light-guiding plate is not slantingly positioned in the space formed by the support main.

24. The display device of claim 1, wherein the fixing device is disposed such that the light-guiding plate does not contact the lamp when the light-guiding plate is deformed.

25. A display device comprising:
a support main;
a lamp that supplies light to the display device;
a light-guiding plate provided in a space formed by the support main; and
means for inhibiting movement of the light-guiding plate toward the support main;
wherein the means for inhibiting is disposed to any one of the support main, the side of the light-guiding plate, and between the support main and the light-guiding plate.

26. The display device of claim 25, wherein the means for inhibiting comprises:
a resilient portion; and
a projection projecting from the resilient portion, the projection in contact with a side of the light-guiding plate.

27. The display device of claim 26, wherein the means for inhibiting further comprises a plate having two gaps between which the resilient portion is disposed.

28. The display device of claim 26, wherein an end of the projection is tapered, the tapered end of the projection in contact with the light-guiding plate.

29. The display device of claim 26, wherein the support main has a groove that receives the resilient portion therein when the resilient portion deforms.

30. The display device of claim 29, wherein the groove retains the non-deformed resilient portion.

31. The display device of claim 26, wherein the inhibiting means is integrally formed with the support main.

32. The display device of claim 26, wherein the inhibiting means is removable from both the light-guiding plate and the support main.

33. The display device of claim 26, wherein the inhibiting means comprises a resilient portion disposed between the light-guiding plate and the support main.

34. The display device of claim 25, wherein the light-guiding plate is inserted into the inhibiting means.

35. The display device of claim 25, further comprising a plurality of inhibiting means that contact the light-guiding plate and inhibit movement of the light-guiding plate toward the support main.

36. The display device of claim 35, wherein the inhibiting means contact opposing sides of the light-guiding plate.

37. The display device of claim 36, wherein at least two of the inhibiting means contact the same side of the light-guiding plate.

38. The display device of claim 37, wherein the inhibiting means on the same side of the light-guiding plate are positioned such that a first inhibiting means is disposed proximate to one corner of the support main and a second inhibiting means is disposed proximate to another corner of the support main.

39. The display device of claim 36, wherein the inhibiting means contact all sides of the light-guiding plate.

40. The display device of claim 25, wherein the means for inhibiting comprises a means for protecting the light-guiding plate from contacting the lamp.

* * * * *